United States Patent [19]

Khalid

[11] 4,178,618

[45] Dec. 11, 1979

[54] CURRENT LIMITING CIRCUIT BREAKER

[75] Inventor: Joseph M. Khalid, Cedar Rapids, Iowa

[73] Assignee: Square D Company, Park Ridge, Ill.

[21] Appl. No.: 824,588

[22] Filed: Aug. 15, 1977

Related U.S. Application Data

[60] Division of Ser. No. 647,823, Jan. 9, 1976, Pat. No. 4,070,641, which is a continuation-in-part of Ser. No. 465,012, Apr. 29, 1974, Pat. No. 3,943,473.

[51] Int. Cl.$^2$ .............................................. H02H 7/22

[52] U.S. Cl. ........................................ 361/58; 338/61

[58] Field of Search ............... 361/58; 338/61; 29/621

[56] References Cited

U.S. PATENT DOCUMENTS

| | | | |
|---|---|---|---|
| 3,529,210 | 9/1970 | Tashio Ito et al. | 361/58 |
| 3,912,975 | 10/1975 | Knauer et al. | 361/58 |

*Primary Examiner*—C. L. Albritton
*Attorney, Agent, or Firm*—Norton Lesser; Richard T. Guttman; Larry I. Golden

[57] ABSTRACT

A current limiting iron wire resistor having a transformable resistance for a current limiting circuit breaker. Each pole of the circuit breaker includes said resistor in parallel with a pair of auxiliary contacts for current limiting which are in series with a pair of main contacts to open the circuit. The main contacts are separable upon operation of a thermally and electromagnetically operable tripping mechanism, and the auxiliary current limiting contacts separate only on occurrence of a high amplitude fault current above a preselected threshold value. When that value of fault current is reached, the tripping mechanism and associated components which operate the auxiliary current limiting contacts serves to increase arc voltage almost instantaneously to that of the source, about which time the fault current is totally shunted into the current limiting resistor. The resistor is formed in a bent-back serpentine shape to reduce inductance of the parallel resistor circuit which would otherwise be very high with the magnitudes of fault current involved, and to also balance the mutual electromagnetic forces among various sections of the resistor. The resistor also includes integrally formed flattened terminals, and intermediate terminal pieces welded to the flattened terminal of the iron wire resistor between the resistor and the copper conductors leading to and from the resistor at each terminal end. The intermediate terminal pieces have a resistivity characteristic between that of the copper conductors and the iron wire resistor.

10 Claims, 31 Drawing Figures

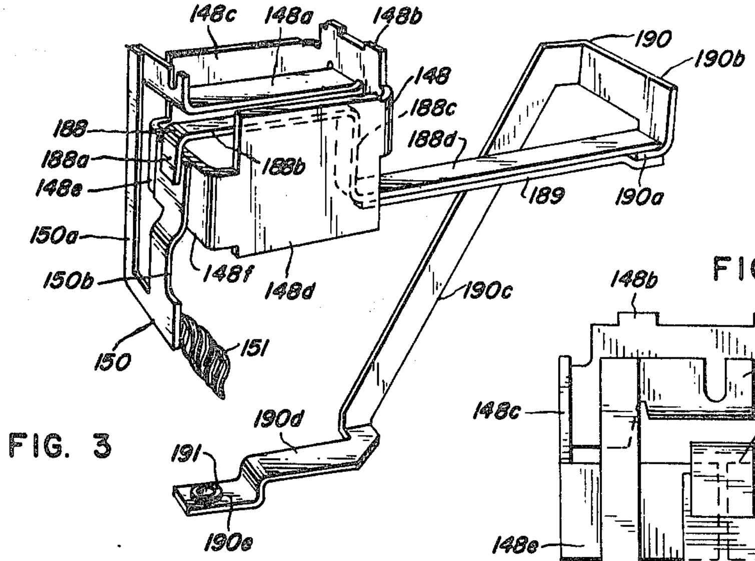
FIG. 3
FIG. 4
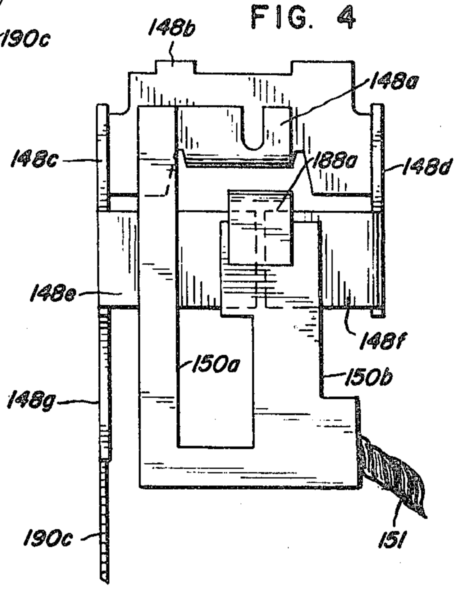
FIG. 5
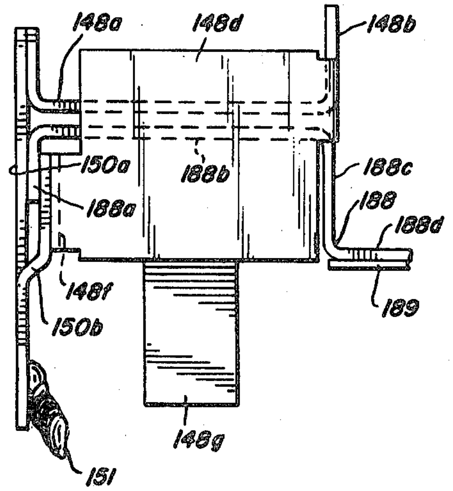
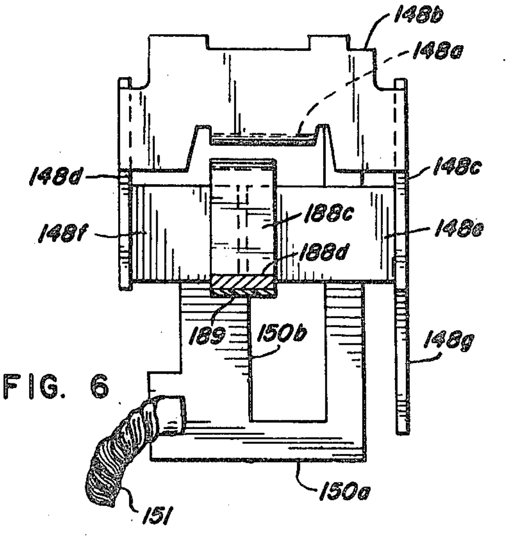
FIG. 6

FIG. 23
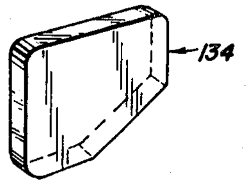
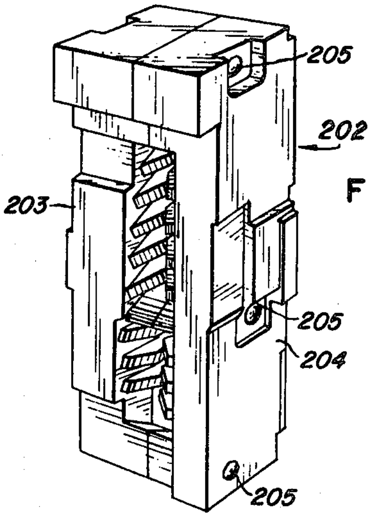
FIG. 20
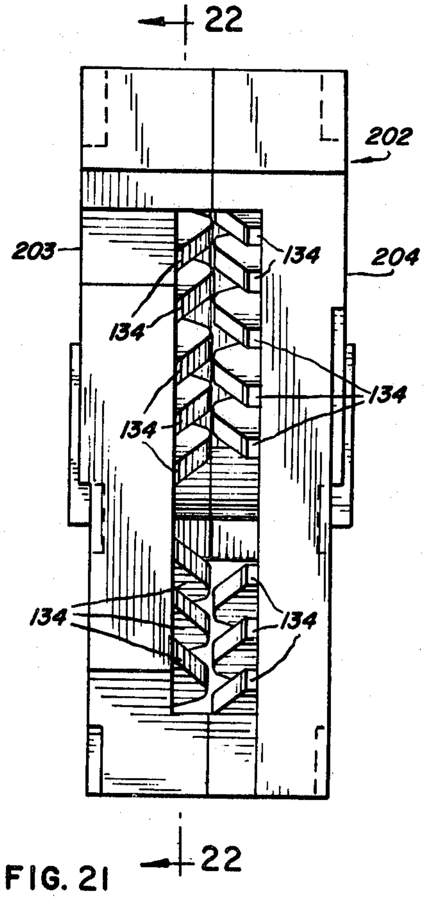
FIG. 21
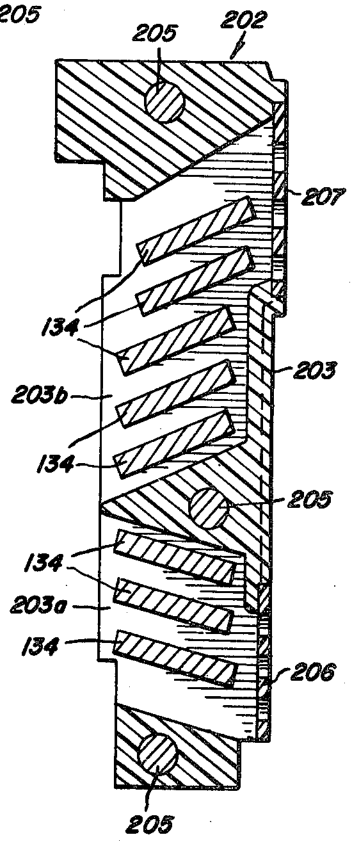
FIG. 22

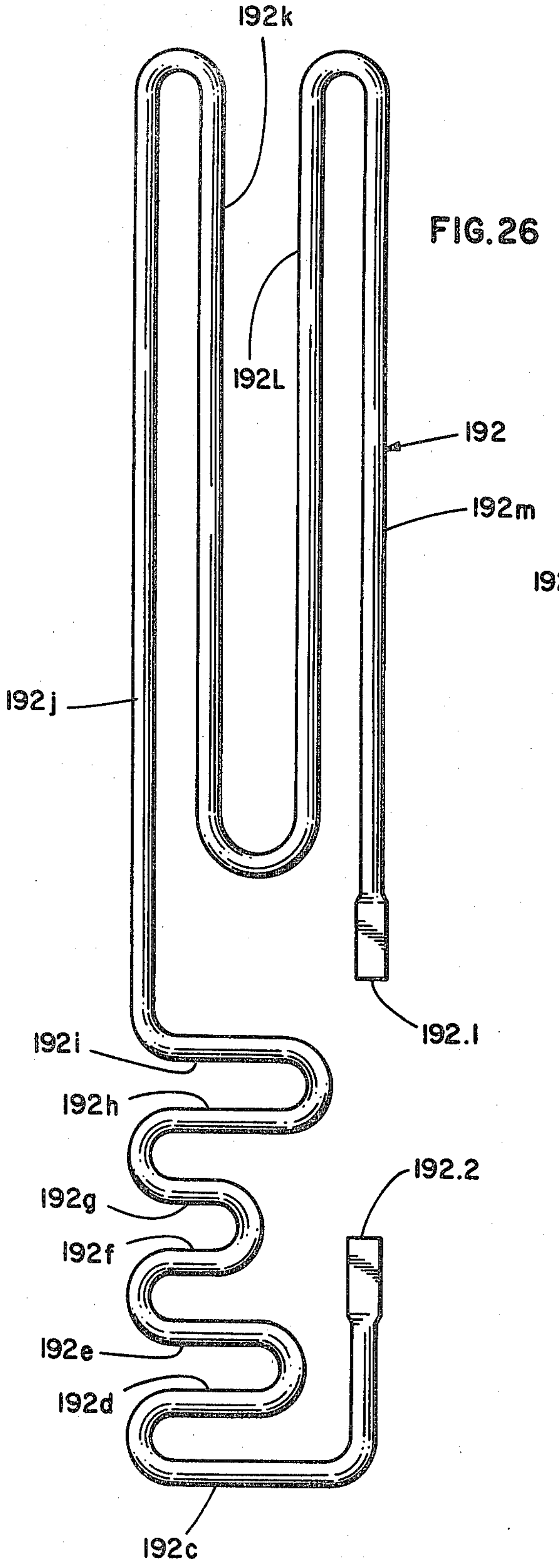
FIG. 26
FIG. 27
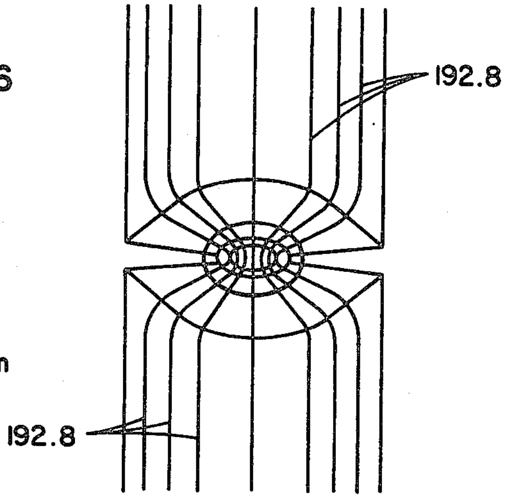
FIG. 28
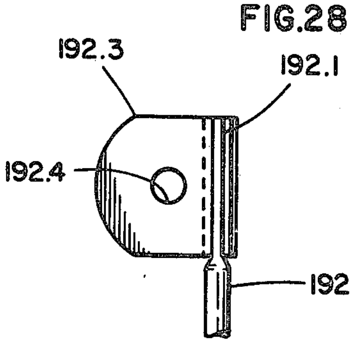
FIG. 29
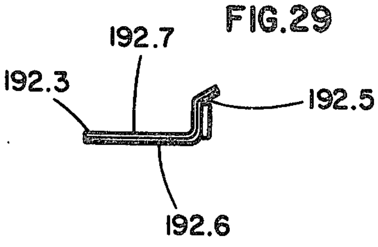

CURRENT LIMITING CIRCUIT BREAKER

RELATED APPLICATION

This is a division of application Ser. No. 647,823 filed Jan. 9, 1976 now U.S. Pat. No. 4,070,641 which is a continuation-in-part of application Ser. No. 465,012 filed Apr. 29, 1974, now U.S. Pat. No. 3,943,473.

BACKGROUND OF THE INVENTION

Before the present invention, a commercially practical current limiting circuit breaker suitable for use in low voltage power distribution systems of about 600 volts or less had been sought by the power distribution and control industry for over thirty years. Various, sometimes conflicting requirements have to be met. For example, a commercially practical current limiting circuit breaker (a) must be repetitively operable at its maximum short circuit interrupting rating without repair or replacement of parts (This requirement precludes the use of fuses, fused switches, or fused circuit breakers for achieving current limiting.); (b) must not have a temperature rise at the terminals of more than 50 degrees Centigrade at rated steady state current to meet appropriate standards of safety and performance established for circuit breakers used in power distribution systems of 600 volts or less (This requirement precludes the use of a large built-in resistance to limit current.); (c) must have a design applicable to a wide range of steady state current ratings, from a few amperes to hundreds of amperes; (d) must have current limiting capabilities competitive with those of the best available other current limiting devices including fuses (This requires that the device will operate in a fraction of a millisecond when the available short circuit current is 100,000 amperes or more.); (e) must be compact enough to fit into existing circuit breaker panelboards (This requires that the ratio of interrupting rating to volume be equal to or greater than that for any prior circuit breaker.); (f) must use non-toxic, non-hazardous materials; (g) must have a response time which decreases proportionately as much as or faster than available short circuit current is increased; (h) must be economically competitive with present circuit protective devices; and (i) must function without inducing severe transient voltages. None of the prior current limiting circuit breakers meets all the above requirements.

SUMMARY OF THE INVENTION

An object of the invention is to provide a current limiting circuit breaker which meets all the above requirements.

Another object is to provide a current limiting circuit breaker including a pair of main contacts, electromagnetically and thermally operable tripping means for opening the pair of main contacts, a pair of auxiliary contacts for current limiting in series with the pair of main contacts, electromagnetically operable means for opening the pair of auxiliary contacts, a field magnet associated with the pair of auxiliary contacts, and a resistor connected in parallel with the pair of auxiliary contacts, the resistor having a positive temperature coefficient of resistance and the parallel circuit through the resistor including a pair of conductor turns associated with the field magnet.

A further object is to provide an improved, fast acting mechanism for opening the pair of auxiliary contacts of such a current limiting circuit breaker.

Still another object is to provide an improved conductor-turn arrangement for the electromagnetically operable means for opening the pair of auxiliary contacts of such a current limiting circuit breaker.

Yet another object is to provide an improved field magnet structure for the pair of auxiliary contacts of such a circuit limiting circuit breaker.

A still further object is to provide an improved electromagnetically and thermally operable tripping means for the pair of main contacts of such a current limiting circuit breaker.

Another object is to provide an improved movable contact blade mounting arrangement for the pair of main contacts of such a current limiting circuit breaker.

An additional object is to provide a current limiting circuit breaker having means to rapidly increase the voltage drop across the arc formed between the auxiliary contacts in the current limiting section to a value which equals the supply voltage of the source in substantially less than a quarter cycle and in about one millisecond of time, thus checking any further rise in current and almost simultaneously shunting the current through a current limiting resistor connected in parallel with the current limiting contacts. This action increases the power factor to near unity thereby enabling interruption of a potentially high fault current in less than one-quarter cycle of current.

An additional object is to provide a current limiting circuit breaker wherein means to rapidly increase arc voltage between auxiliary contacts to equal the voltage of the source includes electromagnetic means to rapidly separate and lengthen the gap between said contacts, first magnet means to simultaneously produce magnetic lines of force to rapidly move said contacts apart in divergent directions and to blow the arc between said contacts in a third direction away therefrom, causing an additional lengthening of the arc and cooling thereof, thus rapidly increasing arc resistance to raise the arc voltage to that of the source, until saturation said electromagnetic means being operative to increase speed of action proportional to the increase in value of the square of the through fault current, and likewise until saturation said field magnet means being operative to increase the speed of action also with the square of the increase in value of the through fault current.

An additional object is to provide a current limiting circuit breaker including means to prevent opening of the auxiliary contacts below a threshold fault current of a selected magnitude.

An additional object of the invention is to provide a current limiting iron wire resistor having a transformable resistance to limit high amplitude fault currents and thereby facilitate interruption of the circuit by a circuit breaker in which said current limiting resistor is connected.

An additional object of the invention is to provide a current limiting resistor having a transformable resistance for use in a circuit breaker in parallel with separable contacts, in which said resistor is formed in a bent-back serpentine shape to reduce inductance which would otherwise reach substantial values in the resistor loop.

An additional object of the invention is to provide a current limiting iron wire resistor having a positive temperature coefficient of resistance, and means to absorb and cushion high blow-apart forces resulting from abrupt transfer of current from copper conductors of low resistivity to an iron wire resistor of high resistivity which becomes transformably higher with temperature.

An additional object of the invention is to provide a current limiting iron wire resistor having a positive temperature coefficient of resistance in which the terminals are integrally formed and flattened, and including intermediate terminal pieces welded thereto which have a resistivity characteristic intermediately between that of copper and iron.

Other objects and advantages will become apparent when the following specification is considered along with the accompanying drawings.

BRIEF DESCRIPTION OF THE DRAWINGS

FIGS. 3, 4, 5 and 6 are perspective, left end, side, and right end views, respectively, of an assembly of electrical conductors associated with an electromagnet in a current limiting portion of any one of the poles of the current limiting circuit breaker of FIG. 1, portions being broken away or omitted in FIGS. 4, 5, and 6;

FIGS. 20 and 21 are perspective and front views, respectively, of an arc chute adjacent the load terminal assembly of any one of the poles of the current limiting circuit breaker of FIG. 1;

FIG. 22 is a sectional view taken generally along the line 32—32 of FIG. 31;

FIG. 23 is a perspective view of one of the arc plates in the arc chute of FIGS. 20–22;

FIG. 26 is a plan view of an iron wire resistor in accordance with this invention having modified terminal ends;

FIG. 27 is a diagramatic sketch illustrating lines of current flow between two conductors of which end fragments are shown, illustrating how the lines of current flow are constricted at the junction between the two conductors;

FIG. 28 is a plan view of an intermediate terminal member having intermediate resistivity between that of copper and iron, welded to an iron wire resistor of which an end fragment is shown; and FIG. 29 is an elevation view showing the side edge of the intermediate terminal member and end of the iron wire resistor shown in FIG. 27.

DETAILED DESCRIPTION OF PREFERRED EMBODIMENT

Figure 1:
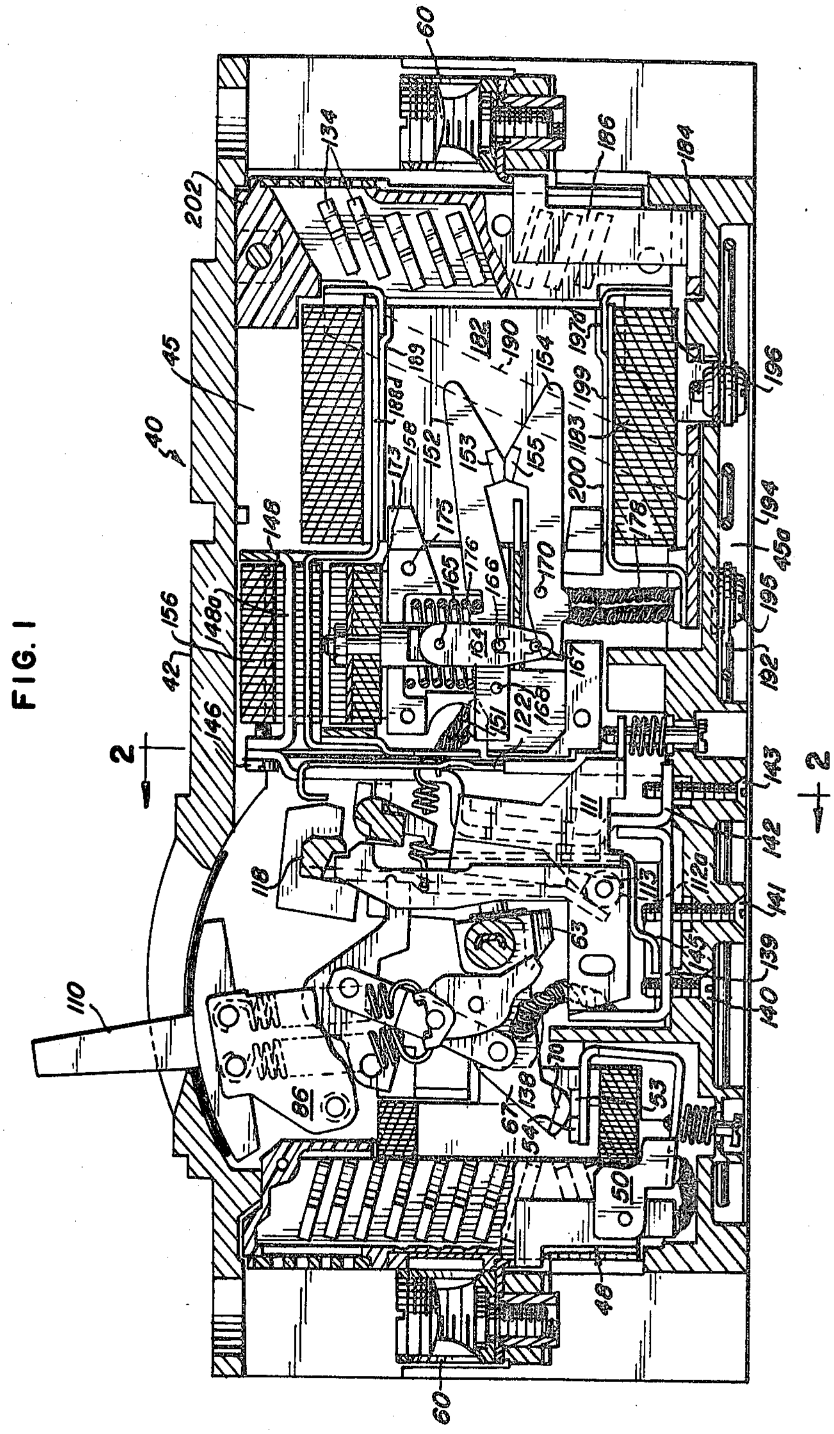
FIG. 1 is a longitudinal sectional view of a three-pole current limiting circuit breaker constructed in accordance with the invention, taken generally along the line 1—1 of FIG. 2 and showing a center pole thereof with parts in an ON position.
Figure 2:
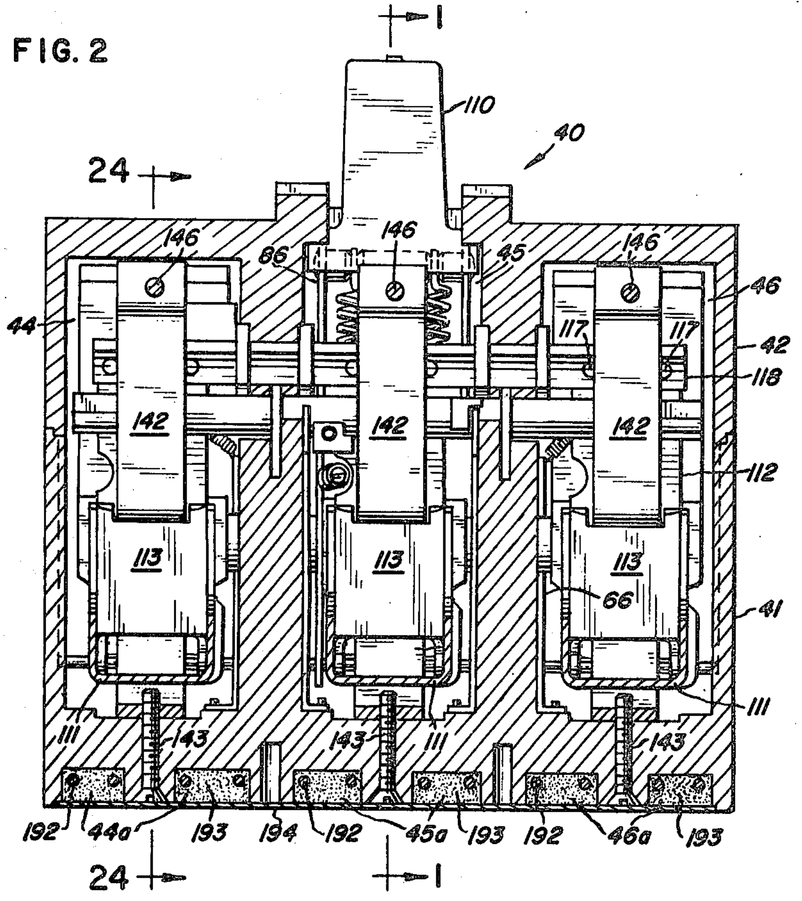
FIG. 2 is a cross sectional view of the current limiting circuit breaker of FIG. 1, taken generally along the line 2—2 of FIG. 1.
Figure 24:
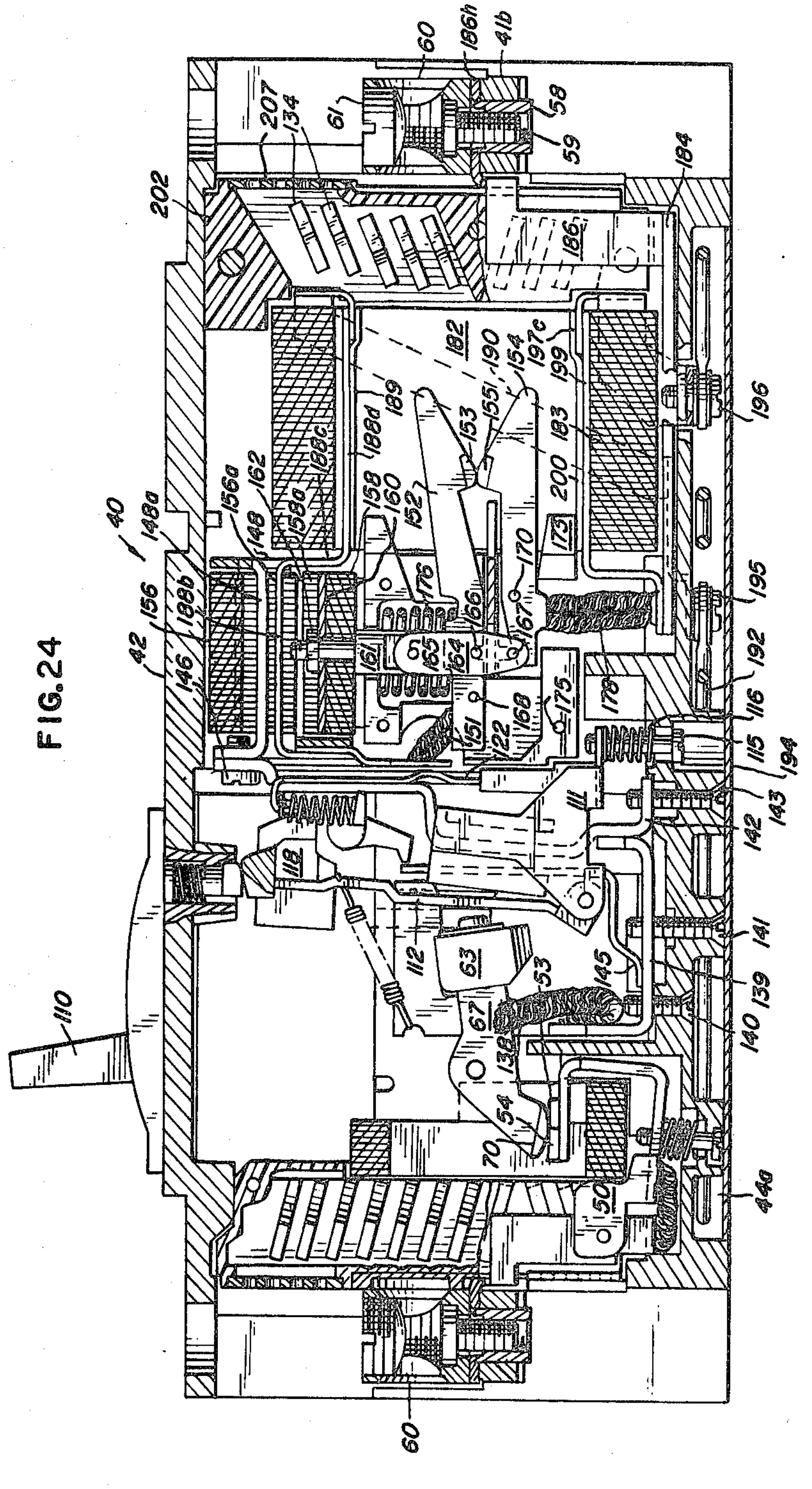
FIG. 24 is a longitudinal sectional view of the current limiting circuit breaker of FIG. 1, taken generally along the line 34—34 of FIG. 2 and showing an outer pole thereof with parts in an ON position.
Figure 25:
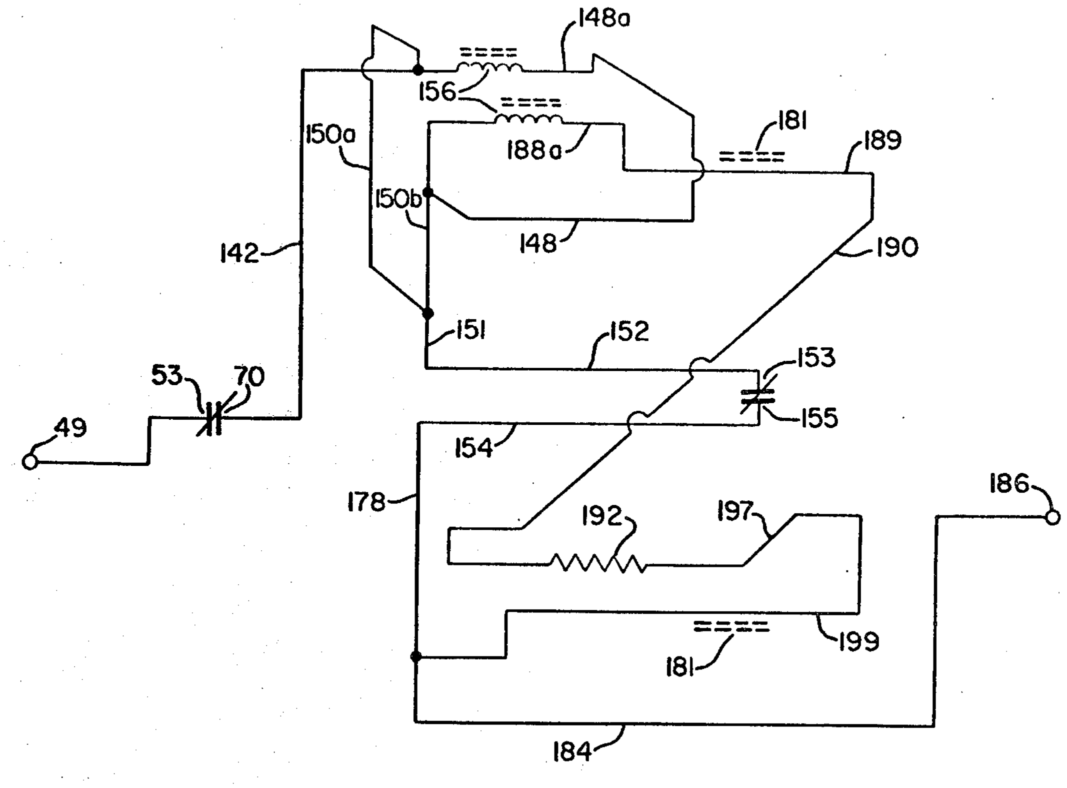
FIG. 25 is a schematic drawing illustrating the current path from line to load through the circuit breaker.
Figure 30:
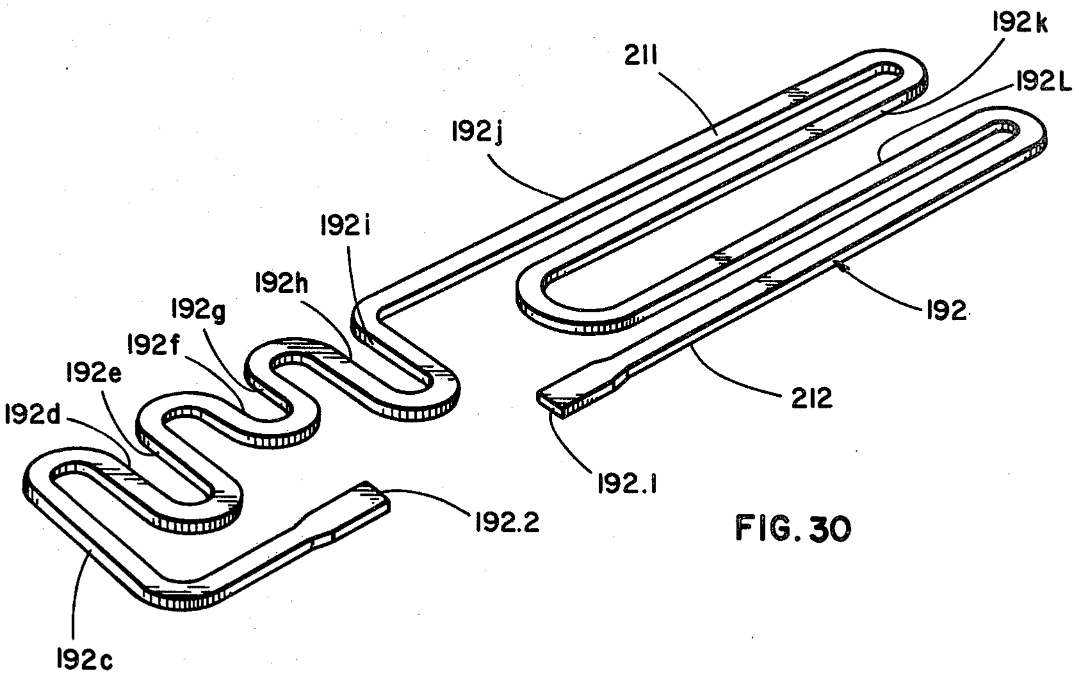
FIG. 30 is a perspective view of a resistor in accordance with this invention having a substantially square cross-section with slightly enlarged flat end portions.
Figure 31:
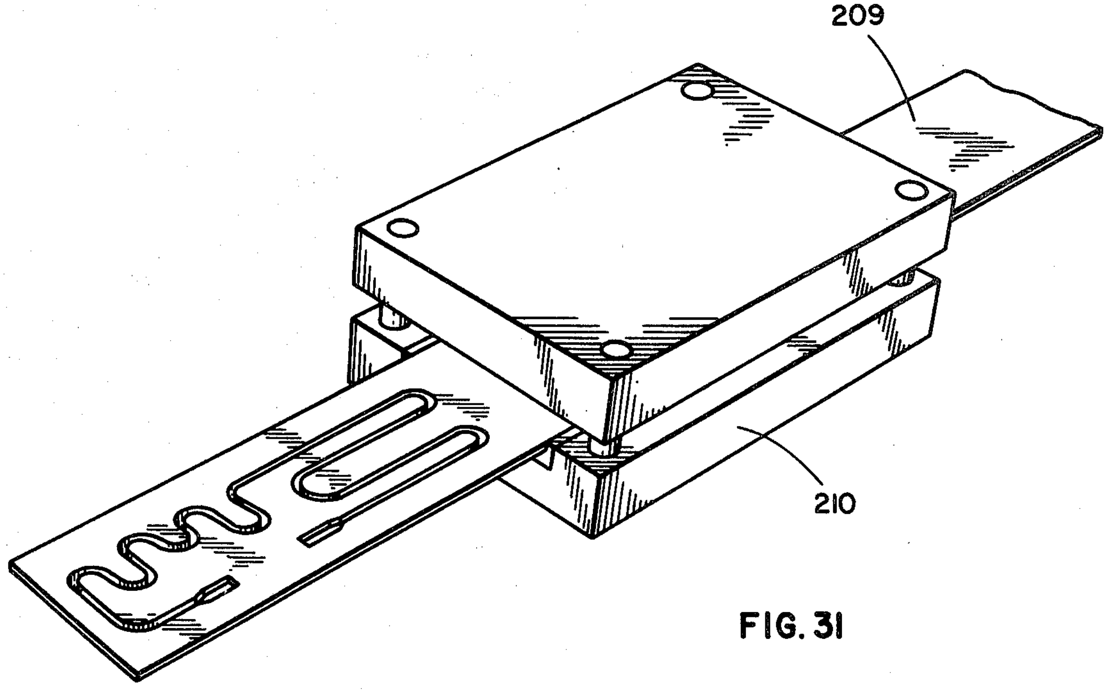
FIG. 31 is a perspective view of a strip of sheet iron from which a resistor as shown in FIG. 30 has been punched, and of a corresponding die.

With reference to the drawings, a three-pole current limiting circuit breaker 40 constructed in accordance with the invention is shown in FIGS. 1, 2, and 24. The circuit breaker 40 is described and illustrated in detail in aforementioned U.S. Pat. No. 3,943,473 includes a molded case comprising a molded base 41 and a complementary molded cover 42 each having a pair of outer side walls and a pair of spaced intermediate walls to provide three compartments 44, 45, and 46 (FIG. 2). The structure of a center pole of the circuit breaker 40 disposed in the center compartment 45 is shown in FIG. 1.

A line terminal and stationary contact assembly 48 is shown adjacent the left end of FIG. 1.

The terminal assembly 48 in each compartment includes a terminal 60 for extending a connection from an external conductor and a contact 54 engaged by a contact 70 on movable blade 67, which is mounted on a crossbar 63 and extends the connection through a flexible cable 138 to tandem connected conductors 139 and 142 extending to the current limiting assembly of the circuit breaker 40. The blades 67, if conventionally operated by the trip crossbar 118 and an operating assembly 86, open the respective circuit between terminal 60 and conductors 142 at contact 54 and 70. The crossbar 118 and operating assembly 86 are controlled in response to either a sustained overload condition detected by a bimetal 145 or a fault current condition detected by a magnetic assembly 111. When the fault condition has been cleared, handle 110 is operated to conventionally control the operating assembly 86 to reset the blades 67 to permit the breaker to respond to another fault condition. The current limiting assembly is provided in the event of very high fault currents above those at which the blade 67 is moved in time to prevent damage.

The end of each conductor 142 opposite the end secured by the screw 143 is connected by a screw 146 (FIGS. 1, 2, and 24) to a flatwise L-shaped strap portion 148*a* of a box-like conductor 148 best shown in FIGS. 13–16. The conductor 148 includes the strap portion 148*a*, an end portion 148*b*, a pair of spaced side portions 148*c* and 148*d*, and a split end portion including a tab portion 148*c* extending from the side portion 148*c* and a tab portion 148*f* extending from the side portion 148*d*. The side portions are generally square, except that the side portion 148*c* includes a mounting tab 148*g* extending toward the base 41 when assembled.

In each of the compartments 44, 45, and 46, a conductor 150 includes an edgewise L-shaped portion 150*a* secured at an end of a longer leg thereof to a tab extending from a shorter leg of the strap portion 148*a* and joined at an end of a shorter leg thereof to an end of a strap portion 150*b* having an opposite end secured to the tab portions 148*e* and 148*f*. A flexible braided cable 151 is secured at one end to the conductor 150 and at the other end to auxiliary contact means for current limiting, including a movable contact blade 152 (FIGS. 1 and 24) having a contact 153 mounted thereon. The blade 152 cooperates with another movable contact blade 154 having a contact 155 mounted thereon.

Figure 7:
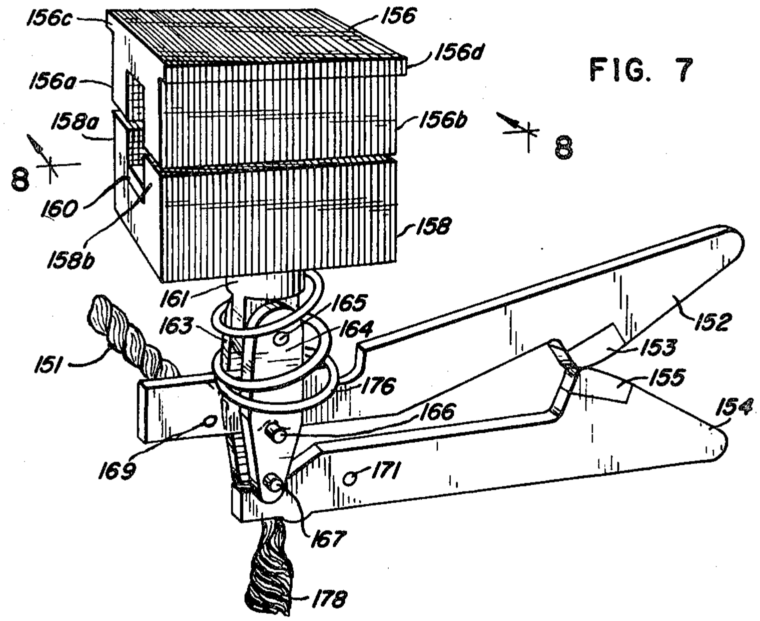
FIGS. 7, 8, and 9 are perspective, side, and end views, respectively, of an electromagnet and contact blade assembly of any one of the poles of the current limiting circuit breaker of FIG. 1, the electromagnet being associated with the conductor assembly of FIGS. 4–6 and having portions broken away in FIGS. 8 and 9.
Figure 8:
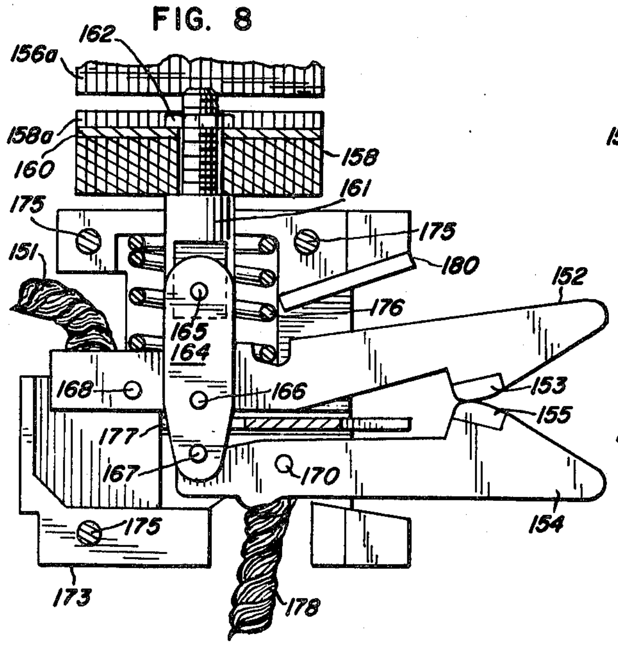
Figure 9:
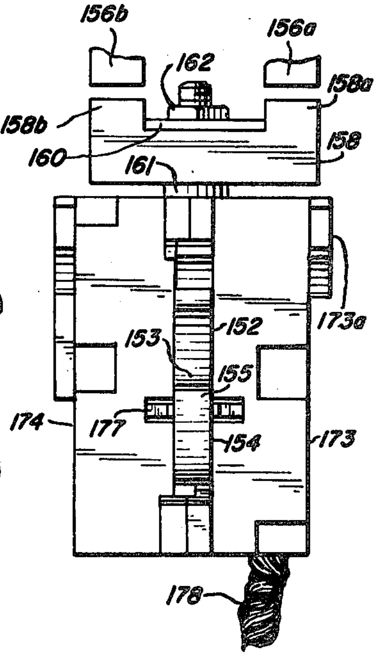

In each of the compartments 44, 45, and 46, the mechanism by which the blades 152 and 154 are operated is best shown in FIGS. 7–9. A generally U-shaped laminated magnetic core 156 is disposed in an outer portion of the box-like conductor 148 (FIGS. 1 and 24) with a pair of spaced leg portions 156*a* and 156*b* thereof (FIG. 7) stradling the strap portion 148*a* and a pair of oppositely extending shoulder portions 156*c* and 156*d* thereof (FIG. 7) respectively engaging the side portions 148*c* and 148*d* (FIG. 3). A generally U-shaped laminated armature 158 (FIGS. 7–9) is disposed in an inner portion of the box-like conductor 148 (FIGS. 1 and 24) with a pair of spaced relatively short leg portions 158*a* and 158*b* thereof (FIGS. 7 and 9) disposed respectively opposite and in spaced relationship to the leg portions 156*a* and 156*b*. An armature pin support plate 160 is disposed between the leg portions 158*a* and 158*b*. The armature 158 is provided with a hole disposed centrally of a bight portion thereof and aligned with a hole in the support plate 160 for receiving an outer threaded stud portion of an armature pin 161 having a nut 162 threaded thereon to secure an inner, enlarged shouldered portion of the pin 161 against an inner side of the armature 158. The armature pin 160 is provided with a pair of opposed flats at its inner end and two spaced links 163 and 164 are pivotally mounted thereon by a pin 165. The links 163 and 164 carry a pin 166 engaged in a notch in an edge of the blade 152 facing the blade 154 and a pin 167 normally engaged with an edge of the blade 154 facing the blade 152. The blade 152 is pivotally mounted on a pin 163 received in a hole 169 (FIG. 7) and the blade 154 is pivotally mounted on a pin 170 received in a hole 171. The pivot pins 168 and 170 are disposed on opposite sides of the armature pin 161 and opposite end portions thereof are received respectively in a pair of molded inner casing portions 173 and 174 (FIG. 9) secured together by a plurality of rivets 175. A compression spring 176 disposed in the casing portions 173 and 174 encircles the armature pin 161 and bears on the blade 152 to urge it clockwise in FIG. 8 toward closed position. The blade 152 bears on the pin 166 and causes the pin 167 to bear on the blade 154 to urge it counter-clockwise in FIG. 8 toward closed position. The spring 176 is also a return spring for the armature 158 and armature pin 161. A shield 177 (FIGS. 8 and 9) having a forked end portion straddling the links 163 and 164 is disposed between the blades 152 and 154 and mainly within the casing portions 173 and 174. Appropriate openings are provided in the casing formed by the casing portions 173 and 174 for the armature pin 161, the cable 151, the contact blades 152 and 154, and a flexible braided cable 178 secured to the blade 154. The sides 148*c* and 148*d* of the box-like conductor 148 respectively engage the casing portions 173 and 174, and the mounting tab 148*g* (FIGS. 5 and 6) is disposed between a pair of bosses on the casing portion 173, one such boss 173*a* being shown in FIG. 9. The contact end portions of the blades 152 and 154 are disposed outwardly of the casing 173–174 and a piece of shock absorbing material 180 (FIG. 8) is mounted in the casing adjacent the blade 152 to cushion opening movement thereof.

Figure 13:
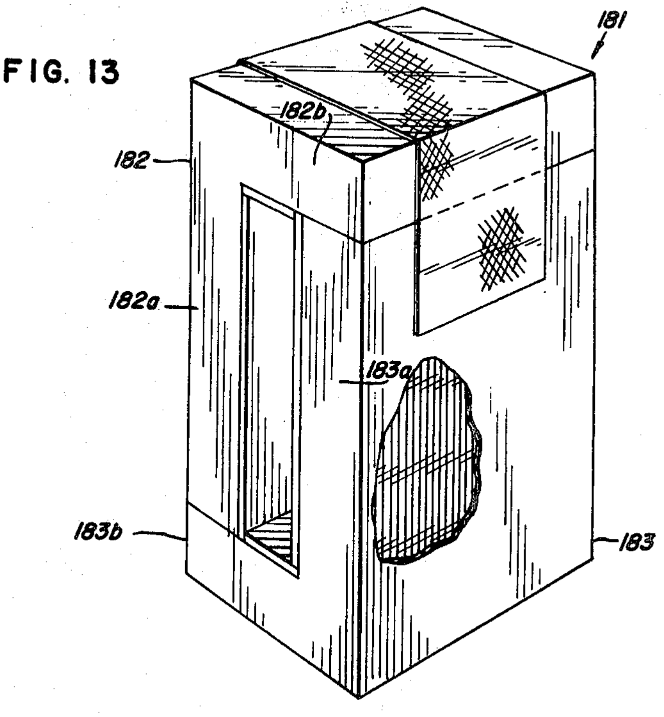
FIGS. 13, 14, and 15 are perspective, end, and side views, respectively, of a field magnet assembly of any one of the poles of the current limiting circuit breaker of FIG. 1.
Figure 14:
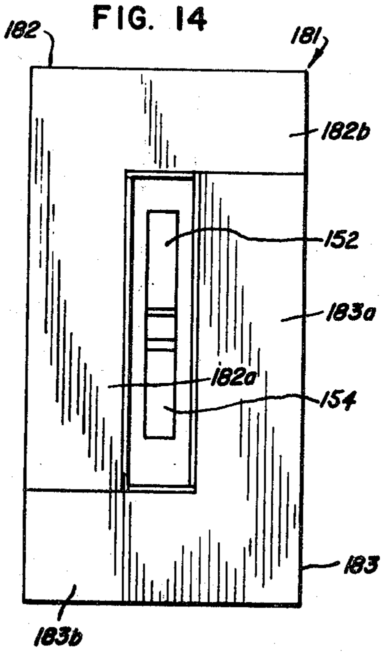
Figure 15:
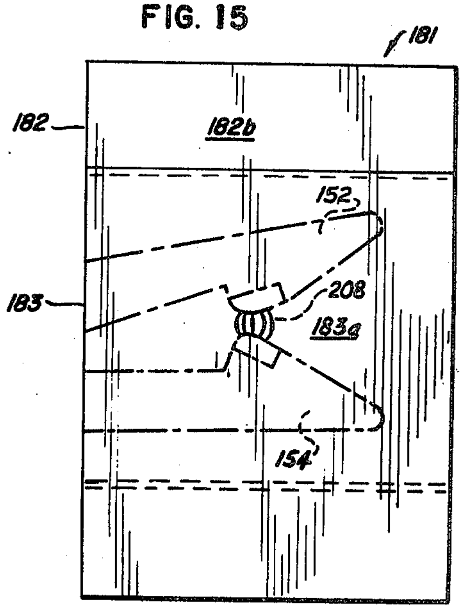
Figure 16:
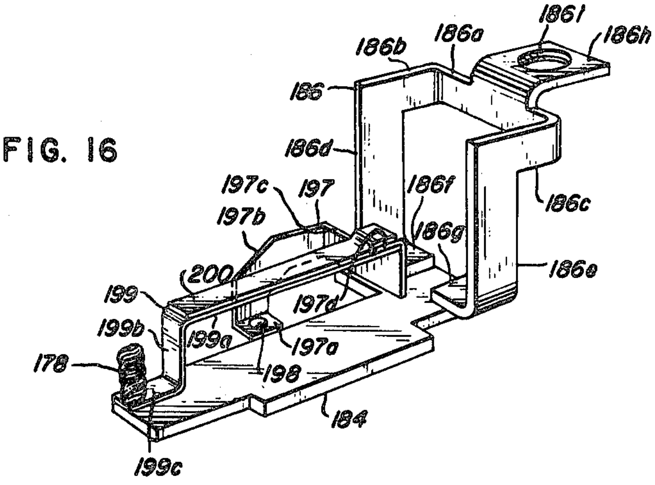
FIGS. 16, 17, 18, and 19 are persepective, top, inner end, and side views, respectively, of an electrical conductor and load terminal assembly of any one of the poles of the current limiting circuit breaker of FIG. 1.
Figure 17:
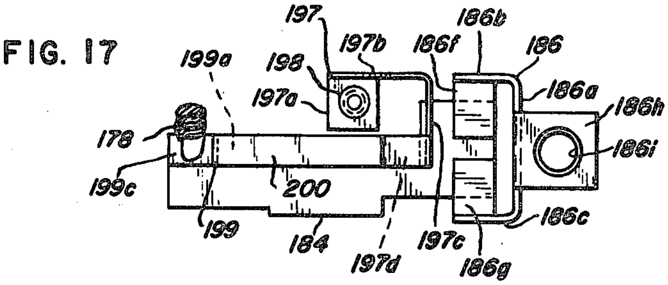
Figure 18:
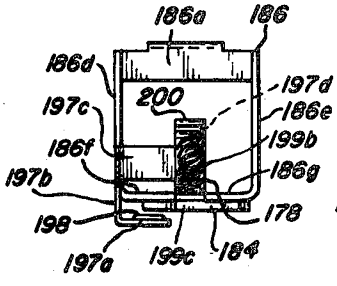
Figure 19:
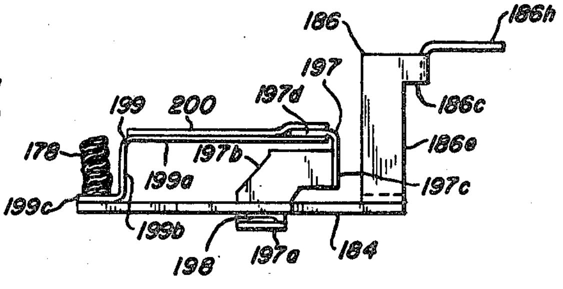

A magnetic core structure 181 generally in the form of a rectangular tube surrounds the contact end portions of the blades 152 and 154 extending outwardly of the casing 173–174. The magnetic core structure 181 is best shown in FIGS. 13–15 and comprises two identical, generally L-shaped, laminated magnetic cores 182 and 183 arranged as shown with an end of a long leg portion 182*a* of the core 182 abutting an inner side of a short leg portion 183*b* of the core 183 and an end of a long leg portion 183*a* of the core 183 abutting an inner side of a short leg portion 182 *a* of the core 182. Each of the cores 182 and 183 is coated with an arc extinguishing material such as disclosed in the aforesaid copending application, Ser. No. 364,596, U.S. Pat. No. 3,929,660 and additional pieces of such material are adhesively secured respectively to inner sides of the L-shaped assemblies as shown in FIGS. 13 and 14. Alternatively, the cores 182 and 183 could be generally U-shaped, C-shaped or J-shaped.

In each of the compartments 44, 45, and 46, the cable 178 connected to the blade 154 is electrically connected at an opposite end to one end of a terminal strap 184 best shown in FIGS. 16–19 and having a terminal member 186 secured to an opposite end. The terminal member 186 is similar to the terminal member 49 and has a bight portion 186*a* and a pair of spaced leg portions 186*b* and 186*c* as a first U-shaped portion, the leg portions 186*b* and 186*c* merging at right angles respectively with a pair of spaced leg portions 186*d* and 186*e* of a second U-shaped portion having a split bight portion formed by two tabs 186*f* and 186*g* extending respectively from the leg portions 186*d* and 186*e*. The tabs 186*f* and 186*g* are secured to the terminal strap 184. A mounting tab 186*h* having an aperture 186*i* extending therethrough projects at right angles from the bight portion 186*a* oppositely from the leg portions 186*b* and 186*c*.

An internally threaded sleeve 58 (FIGS. 1 and 24) identical to those staked to the tabs 49*h* is staked to the mounting tab 186*h* of each of the terminal members 186 at the aperture 186*i* therein and disposed in an apertured mounting pad portion 41*b* of the base 41. A screw 59 threaded into the sleeve 58 secures an apertured connector body 60 to the tab 136*h*. The connector body 60 is identical to those secured to the tabs 49*h* and is provided with an internally threaded hole for receiving a clamping screw 61.

In each of the compartments 44, 45, and 46, a conductor 188 (FIGS. 3–6) has a tab 188*a* secured to the end of the strap portion 150*b* adjacent the tabs 148*e* and 148*f*, a strap portion 188*b* (FIGS. 1 and 24) extending between the leg portions 156*a* and 156*b* of the magnetic core 156, an offsetting portion 188*c* extending generally parallel to the tab 188*a*, and a strap portion 188*d* extending through the magnetic core assembly 181 formed by the two L-shaped magnetic cores 182 and 183 along the inner side of the short leg portion 182*b*. A strip 189 of arc extinguishing material such as disclosed in the aforementioned copending application. Ser. No. 364,596, is adhesively secured to the side of the strap portion **188*d* facing the contact blade 152. A conductor 190 includes a tab portion 190*a* secured to an end of the strap portion 188*d* and extending and bent from a strap portion 190*b*. The strap portion 190*b* extends parallel to an end face of the magnetic core 182 and is joined at right angles to a strap portion 190*c* extending somewhat diagonally across the outer side of the long leg portion 182*a*. The strap portion 190*c* is joined at right angles to a strap portion 190*d* extending along a rear wall of the base 41 and having an apertured offset connecting tab portion 190*e* disposed in a hole extending through the rear wall of the base 41. An internally threaded fastener 191 is secured to the connecting tab portion 190*e***.

Figure 10:
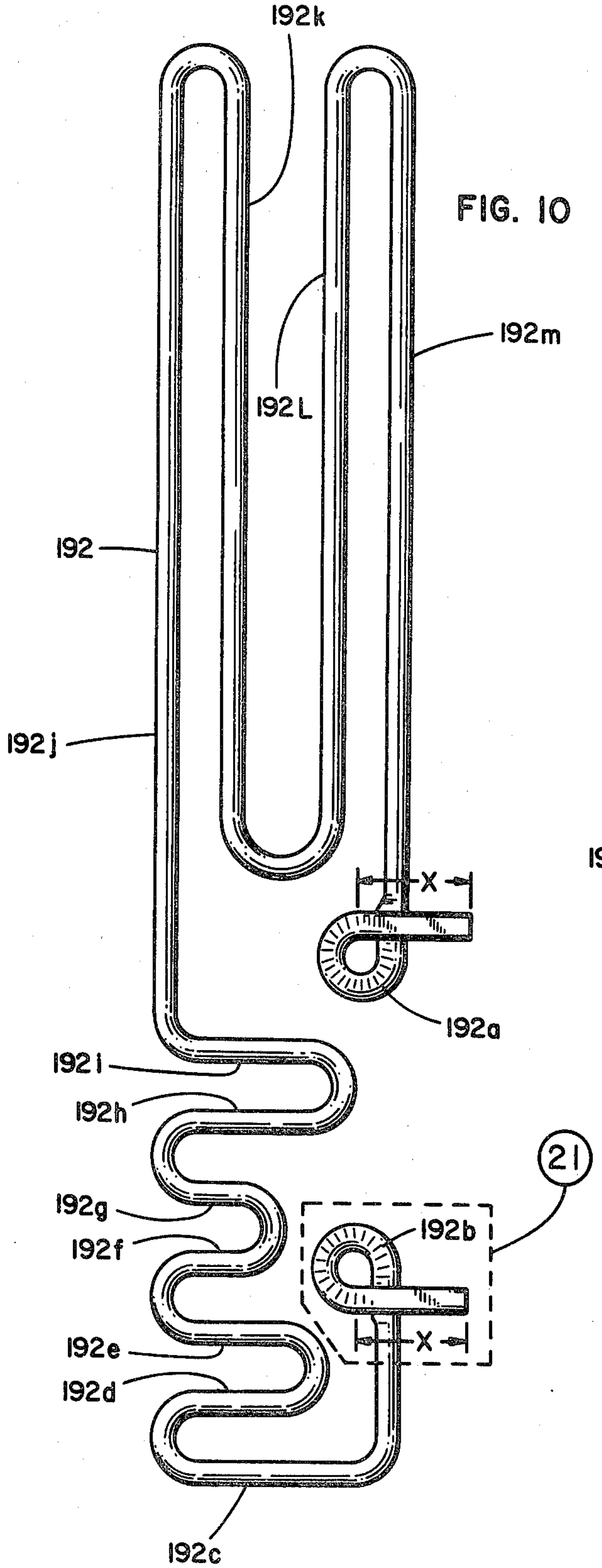
FIG. 10 is a plan view of an unfinished current limiting resistor for any one of the poles of the current limiting circuit breaker of FIG. 1, the unfinished resistor including end portions to be cut off after electroplating.
Figure 12:
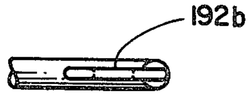
FIG. 12 is an edge view of the resistor end portion.
Figure 11:
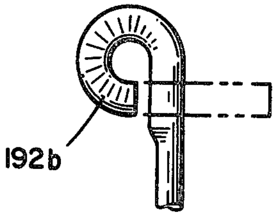
FIG. 11 is a plan view of the end portion of the resistor within the dotted enclosure 21 of FIG. 10, the broken line portion in FIG. 11 indicating a portion which is cut away after electroplating.

Opposite the compartments 44, 45, and 46, the rear wall of the base 41 is provided on the rear side with three shallow recesses **44*a*, 45*a*, and 46*a* (FIG. 2) each having a resistor 192 potted therein with potting material 193, preferably a ceramic compound having properties of good thermal conductivity, such as alumina or silica based ceramics. A thin plastic cover 194 is recessed in the base 41 and adhesively secured in place to cover the potting material in all three of the recesses 44*a*, 45*a*, and 46*a*. The resistor 192 in each recess is made of material having a positive temperature coefficient of resistance, is preferably chromium-plated substantially pure iron wire, and is best shown in FIGS. 10–12. An important feature of the resistor 192 is that its resistance is transformable from a relatively low value to a relatively much higher value. Other materials which have a positive temperature coefficient of resistance and can be used for the resistor 192** in place of substantially pure iron include tungsten, nickel, cobalt, and alloys or metallic compounds of these and other elements such as cobalt-iron and zirconium diboride. In these materials, the resistance is a direct function of temperature.

As shown in FIG. 10, the resistor 192 terminates at each end in a flattened, generally P-shaped portion which includes a straight portion of length "X" to which an electrode is attached for electroplating in a solution containing chromium. After electroplating, the electrode terminal portions, as shown in broken lines for one of the end portions in FIG. 11, are cut off, and the remainder of the flattened end is aligned with the plane containing the axis of the circular wire, as shown in FIG. 12.

The physical form of the resistor 192 in accordance with this invention is such that inductance in the parallel resistor circuit is made vanishingly small, the mutual electromagnetic forces among various sections of the iron wire resistor are balanced, and blowapart forces at the terminal ends of the resistor are reduced to handle the great magnitude of fault currents the breaker is intended to interrupt.

To make the inductance in the parallel resistor loop vanishingly small, the resistor 192 is formed in a sinuous or serpentine configuration as shown in FIG. 10. The resistor thus includes a plurality of short sinuous segments including sinuous segment 192 (*c*) to carry current in one direction, continuously joined sinuous segment 192(*d*) bent back to lie parallel to segment 192(*c*) for a substantial portion of its length spaced apart therefrom a short distance, to carry current in a direction opposite to that of segment 192(*c*). Sinuous segment 192(*e*) is similarly continuously joined to segment 192(*d*) and bent back to lie parallel thereto for a substantial portion of its length, spaced apart therefrom a short distance, to carry current in a direction opposite to that of segment 192(*d*). Sinuous segment 192(*f*) is similarly formed with reference to segment 192(*e*), segment 192(*g*) with reference to segment 192(*f*), segment 192(*h*) with reference to segment 192(*g*), segment 192(*i*) with reference to segment 192(*h*).

In addition to these short sinuous segments, the resistor 192 also includes a plurality of relatively long continuously joined sinuous segments similarly bent back on each other in closely spaced apart parallel relationshp, namely segment 192(*j*) which carries current in one direction, segment 192(*k*) which carries current in a direction opposite to that of adjacent segment 192(*j*); segment 192(*L*) which carries current in a direction opposite to that of adjacent segment 192(*k*); and segment 192(*m*) which carries current in a direction opposite to that of adjacent segment 192(*L*).

These sinuous segments are spaced apart from respective adjacent segments a distance such that magnetic fields created around each segment as a result of current flow interacts with the magnetic fields of respective adjacent segments to substantially cancel each other out. In this way, inductance of the resistor loop is made vanishingly small.

In view of the very high fault currents which the breaker in accordance with this invention is intended to interrupt, and the objective of raising arc voltage almost instantaneously to source voltage to force current into the current limiting resistor rapidly, it is important to make the inductance of the parallel resistor loop as small as possible. The process of current transfer into the resistor 192 involves very high rates of arc current decay between the contacts 153 and 155 of the limiter contact blades 152 and 154. Values of decay rates (di/dt) in the range of $10^7$ to $10^8$ amps per second have been measured. Any appreciable inductance in the parallel resistor circuit would therefore cause the induced voltage to be high, since induced voltage (E) equals inductance (L) times decay rate (di/dt), or $E=L(di/dt)$.

The induced voltage E would have a polarity such that its magnitude becomes additive to the source voltage, with the sum total of such induced voltage appearing almost entirely across the limiter contacts 153 and 155. Since an objective of the invention is to increase arc voltage to equal source voltage as rapidly as possible, it is of course important to prevent anything from adding to the source voltage. If this component of induced voltage, which would normally arise from inductance in the parallel resistor circuit, were not eliminated by means such as the particularly configured serpentine or sinuous resistor 192 described above, the desired increase in arc voltage would tend to be offset by the increase in induced voltage which is additive to source voltage. Thus, the objective of almost instantaneously raising arc voltage to that of source voltage, to rapidly transfer very high fault current into the current limiting resistor, would tend to be defeated. It is possible that without means to reduce the inductance of the parallel resistor circuit to a vanishingly small value, the effect could be to allow the arc current to persist across the limiter contacts 153 and 155, and thus prevent the current transfer process from taking place at all.

The sinuous or serpentine configuration as described and shown also satisfies the requirement of balancing the mutual electromagnetic forces among the various segments of the resistor wire. These forces are proportional to the square of the current flowing through the resistor. The balancing of forces requirement becomes even more important considering that the resistor is heated to a high temperature of almost 1100 degrees centigrade by the very high fault currents. The serpentine form of the resistor 192, plus the support given the resistor by potting it into the base 41 as described above, enable the resistor to withstand the electromagnetic forces which are a significant factor when dealing with very large values of current.

FIG. 26 illustrates a current limiting resistor 192 similar to that shown in FIG. 10, but having modified terminal ends 192.1 and 192.2. These modified terminal ends are flattened but are not formed into a terminal loop as are terminal ends 192(*a*) and 192(*b*) illustrated in FIG. 10 and FIG. 11. Instead, separate intermediate terminal members 192.3, each having an aperture 192.4, are welded along one edge thereof 192.5 to the flattened terminal ends 192.1 and 192.2 respectively of the resistor 192. The intermediate terminal members 192.3 are made of a material which has a resistivity intermediate between that of copper (of which the conductors leading to the resistor 192 are made) and that of substantially pure iron (of which the resistor 192 is made). A suitable material for intermediate terminal members 192.3 is copper clad stainless steel. The terminal ends 192.1 and 192.2 of the iron wire resistor 192 are welded to the stainless steel side 192.6 of respective intermediate terminal members 192.3. The copper conductors are connected to the copper side 192.7 of respective intermediate terminal members 192.3.

The intermediate terminal members 192.3 having a resistivity between that of copper and iron, facilitate transfer of very high values of current from the copper conductors into the iron wire resistor 192. Any time there is a change in the cross-section of a conductor, the lines of current flow 192.8 are constricted as illustrated diagramatically in FIG. 27. One of the consequences of current constriction is the generation of a "blowout" force in the current constriction region. This force is proportional to the square of the current density, and its action tends to blow the conductors apart at the plane of maximum constriction. Accordingly, both the geometry and the material of the terminal have to be selected so as to keep the current density from rising substantially over its value in the conductor having the smaller cross-section.

Applying these principles to the instant invention, current in the iron wire resistor (which has relatively high resistance) has a tendency to flow into the copper conductors at the first point of contact, thus creating a large current density at that point which creates a high "blowout" force. This coupled with a high thermal gradient can result in snapping the conductor open at the terminal regions between the terminal ends 192.1 or 192.2 of the iron wire resistor and respective copper conductors connected thereto.

By inserting the intermediate terminal member 192.3 between each terminal end 192.1 and 192.2 of the resistor and its respective copper conductor, the intermediate members 192.3 of intermediate resistivity absorb some of the initial "blowout" force by allowing a more gradual increase in current density because of their greater resistivity than copper but less than that of the iron resistor. The intermediate terminal members 192.3 thus act as shock absorbers or cushions for the terminal regions between the conductors leading to each end of the resistor 192 and the terminal ends 192.1 and 192.2.

A piece of copper clad stainless steel has been found to be suitable for the intermediate terminal members 192.3. The resistivity of stainless steel is about 70 micro-ohms per centimeter, while that of iron varies between 10 and 130 micro-ohms per centimeter, in the temperature range between room temperature and 1200 degrees centigrade. The resistivity of copper in this range (up to its melting temperature of 1083° C.) varies between approximately 1.6 and 9.1 micro-ohms per centimeter.

In addition to the configuration of the iron wire resistor 192, its length and diameter are also significant in terms of achieving optimum current transfer and current limiting in accordance with this invention. For the high magnitude of current the resistor 192 must be able to limit, such length has been found to be 21 inches, and the diameter has been found to be 0.091 inches, for 3 phase A.C. supply voltages of up to 600 volts, and available fault current up to 100,000 amperes root mean square.

The iron wire resistor 192 may be in the form of a wire of circular cross-section, bent into the serpentine shape as illustrated in the drawings and described herein. It may also be made from iron sheet stock, by punching out resistors in the said sinuous or serpentine configuration from a sheet of iron 209 having the desired thickness. A plurality of such resistors can be made in one stamping operation by using a die 210 corresponding to the sinuous or serpentine configuration of the resistor 192 to punch such resistors out of the iron sheet stock.

The cross-sectional configuration of such resistors may be square or rectangular, or in any event having at least two opposite flat sides 211 and 212 the respective surfaces of which lie in parallel planes. The thickness of the iron sheet material 209 is selected so the cross-sectional dimension of the punched out resistors 192 corresponds to that of the circular resistors 192 made from iron wire stock. For resistors capable of limiting the high magnitudes of current specified herein, the thickness of such iron sheet stock may be approximately 0.08 inches, and the transverse dimension or width of the resistor as cut from such sheet stock may be approximately 0.08133 inches.

The positive temperature coefficient of resistance (TCR) resistor in accordance with this invention is capable of limiting very high magnitudes of current extending up to 100,000 amperes of available fault current root mean square symmetrical, in 50 to 60 Herz A.C. circuits up to 600 Volts. A positive TCR resistor capable of functioning in such circuits, with available fault currents of such magnitude, requires means to reduce mutual induction, to balance electromagnetic forces, to offset constrictive resistance and blowout forces of the terminals where current transfers from a conductor of low resistivity to the positive TCR resistor of increasingly high resistivity and from such resistor to a low resistance conductor, plus other problems of this nature which are insignificant at lower values of current and voltage.

In each of the recesses 44*a*, 45*a*, and 46*a*, a screw 195 (FIGS. 1 and 24) secures an end portion 192*a* of the respective resistor 192 (FIG. 10), modified as described above, to the tab portion 192(*e*) (FIG. 3) of the conductor 190. A screw 196 secures an opposite end portion 192(*b*), modified as described, to an apertured connecting tab portion 197(*a*) of a conductor 197 (FIGS. 16–19). An internally threaded fastener 198 is secured to the connecting tab portion 197*a*. The conductor 197 includes a strap portion 197b extending at right angles to the connecting tab portion 197a along an end of the short leg portion 183b of the magnetic core 183 and joined at right angles to a strap portion 197c extending along an end face of the core 183. A bent tab 197d extending from the strap portion 197c is secured to a conductor 199 having a strap portion 199a extending through the magnetic core structure 181 along the inner side of the short leg portion 183b of the magnetic core 183. An offsetting portion 199b joins the strap portion 199a to a tab portion 199c secured to the terminal strap 184 and having the cable 178 secured thereto. A strip 200 of arc extinguishing material such as disclosed in the aforesaid copending application, Ser. No. 364,596, is adhesively secured to the side of the strap portion 199a facing the contact blade 154.

In each of the compartments 44, 45, and 46, an arc chute 202 (FIGS. 1 and 2) for the contacts 153 and 155 is disposed adjacent the magnetic core structure 181. The arc chute 202 is best shown in FIGS. 20–22 and includes a pair of molded casing portions 203 and 204 secured together by a plurality of rivets 205. Each of the casing portions 203 and 204 is provided with a pair of recesses on a side thereof facing the other casing portion, such as an inner recess 203a and an outer recess 203b (FIG. 22) in the casing portion 203, to provide a pair of passageways through the arc chute 202. Each of the casing portions is grooved on a wall of each recess facing the other casing portion and each groove has one of the arcing plates 134, best shown in FIG. 23, adhesively secured therein. A venting plate 206 is adhesively secured to the easing portions 203 and 204 and is disposed in the base 41 rearwardly of the respective connector body 60. A venting plate 207 is adhesively secured to the casing portions 203 and 204 and is disposed in the cover 42 of the assembled circuit breaker 40 forwardly of the respective connector body 60. From the contact side of the arc chute, the arc plates 134 in the inner recess 203a slant toward the rear wall of the base 41, and those in the outer recess 203b slant toward the front wall of the cover 42. The arc plates 134 in the casing portion 204 slant in a similar fashion, but as best shown in FIG. 21, they are staggered with respect to those in the casing portion 203.

In each of the compartments 44, 45, and 46, when the contacts 153 and 155 are closed, part of the current from the conductor 142 flows through the L-shaped portion 150a of the conductor 150 to the cable 151 and the remainder flows by way of the strap portion 148a through the box-like conductor 148 and the strap portion 150b of the conductor 150 to the cable 151. From the cable 151 the total or recombined current flows through the contact blade 152, contacts 153 and 155, contact blade 154, cable 178, and the terminal strap 184 to the terminal member 186.

The strap portion 148a and the magnetic core 156 in each compartment form an electromagnet. Upon flow of a fault current through the strap portion 148a greater than that at which the magnetic core 113 attracts the armature plate 112, the magnetic core 156 attracts the armature 158 along with the plate 160, armature pin 161, nut 162, links 163 and 164, and pins 165, 166, and 167. The pin 166 pivots the blade 152 about the pin 168 toward an open position, and the pin 170 releases the blade 154 so that it is free to pivot about the pin 170 toward an open position under the influence of a repulsion force between the two blades due to the current path through the blades. The blades 152 and 154 are also moved apart by magnetic forces induced by the current flow therethrough, it being noted that they constitute partial conductor turns for the magnetic core structure 181. The contacts 153 and 155 are thus separated to switch the current path through the resistor 192.

The parallel circuits between conductor 142 and cable 151, comprising a circuit through conductor 150a in parallel with the circuit through conductors 148a, 148, and 150b, provides by-pass means for sufficient current to prevent opening the current limiting contacts 153 and 155 until a threshold fault current above a selected magnitude is present for magnetic core 156 to attract armature 158 which opens contacts 153 and 155. By way of example, this circuit arrangement and electromagnet characteristics may be adapted to prevent separation of the limiting contacts 153 and 155 below a threshold of 1,000 amps.

When the contacts 153 and 155 are separated, part of the current from the conductor 142 flows through the L-shaped portion 150a and also through the strap portion 150b of the conductor 150 to the conductor 188, and the remainder flows by way of the strap portion 148a through the box-like conductor 148 to the conductor 188. The recombined current then flows through the conductors 188 and 190, through the resistor 192, through the conductors 197 and 199, and through the terminal strap 184 to the terminal member 186.

The current limiter contacts preferably do not operate in the thermal overload range but only at relatively higher ranges of fault current or short circuit conditions. Within the thermal overload range, one or more of the bi-metallic strips 145 are operable to trip the circuit breaker and open the sets of main contacts 53 and 54 as previously described. Immediately above the thermal overload range, fault currents are still relatively low but are of sufficient magnitude to cause attraction of one or more of the armature plates 112 and open the sets of main contacts 53 and 54 as previously described. Such fault currents are below the interrupting ability of the sets of main contacts 53 and 54. Fault currents immediately above this range are just sufficient to cause magnetic core 156 to attract armature 158 and pin 161 which cause limiter contacts 153 and 155 to open. As the current decays, the magnetic forces also decay. The compression spring 176 in urging contacts 153 and 155 to a closed position tends to dominate over the decaying current causing those contacts to reclose while a short arc still exists in a small air gap between them. This action often leads to contact welding. To solve this problem, an additional or supplemental magnetizing turn 188b is provided in series with current limiting resistor 192. Thus, while fault current still flows in resistor 192, magnetic core 156 will be sufficiently energized to attract armature 158 to hold contacts 153 and 155 apart.

In each compartment, the strap portion 148a is the only effective conductor turn for the magnetic core 156 when the contacts 153 and 155 are closed, and only part of the current flows therethrough, the remainder flowing through the by-pass conductor provided by the L-shaped portion 150a. When the contacts 153 and 155 are open, the strap portion 188b provides an additional conductor turn, and it carries the total current while the strap portion 148a is effective as a conductor turn carrying part of the current. The additional conductor turn 188b enables the blades 152 and 154 to be maintained in an open position with less current than is required to move them to an open position originally. By the time the blades 152 and 154 move back to closed position under the influence of the spring 176, the fault current will have been dissipated in the resistor 192 and the blades 67 will have been opened.

In each of the compartments 44, 45, and 46, the strap portions 188*d* and 199*a* are conductor turns for the magnetic core structure 181. Further, portions of the contact blades 152 and 154 are partial conductor turns for the magnetic core structure 181. When the contact blades 152 and 154 are moved to open position and an arc 208 forms between the open contacts 153 and 155, the magnetic field set up as a result of current flow through the partial conductor turn portions of the contact blades 152 and 154 acts on the arc 208 to force it toward the arc chute 202 with its staggered, slanting arc plates 134. Once the arc is interrupted, the current flow shifts to the previously described path through the resistor 192, and the flow through the conductor turns 188*d* and 199*a* maintains the magnetic field, aids the dielectric strength recovery of the gap, and thereby guards against re-ignition. Any re-ignition of the arc would also take place in a magnetic field, which would force the arc out again.

The device of this invention is compact enough to fit into existing circuit breaker panelboards and yet it is capable of repeatedly interrupting currents in excess of 100,000 amperes root-mean-square (RMS) symmetrical. With such currents available, the arc which forms between the contacts 153 and 155 upon their opening must be extinguished in about a millisecond or less. This is accomplished by the generation of a sustained arc voltage which reaches the magnitude of the impressed supply voltage in about a millisecond or less. The structure used to accomplish this result includes the fast operating mechanism for opening the blades 152 and 154 with their contacts 153 and 155, the magnetic core structure 181, the coating of the arc chamber with arc extinguishing material, and the resistor 192 connected in parallel with the contacts 153 and 155.

The magnetic core structure 181 encloses the contacts 153 and 155 and a substantial portion of the blades 152 and 154 and provides a magnetic field with the maximum practical value of magnetic flux density normal to the blades 152 and 154 and also normal to the arc. The magnetic field exerts a force on each blade tending to "blow" them apart, and also exerts a force on the arc 208 tending to "blow" the arc out toward the arc chute 202. The force is proportional to the product of the current and the magnetic flux density. Since the magnetic flux density is derived from the current, the force is proportional to the square of the current, and the higher the available current is, the faster the blades open and the faster the arc is blown out. The response of the current limiting device is thus proportional to the severity of the short circuit. The magnetic core structure 181 and blades 152 and 154 are so arranged that the lines of force in the magnetic field intersect blades 152 and 153, through which current flows in opposite directions, from the direction which will force said blades apart. As viewed in FIG. 1, when current flows in the direction from cable 151, forward through contacts 153 and 155, then from the contact end of blade 154 back through blade 154 and out through cable 178, then during such current flow the magnetic flux and lines of force in the transverse magnetic field extend from leg 183*a* (FIG. 13) of magnetic core 183 to leg 182*a* (FIG. 13) of magnetic core 182 (FIGS. 1 and 13). This arrangement of current flow through blades 152 and 154, and magnetic flux across said blades tends to force blades 152 and 154 apart.

Furthermore, when blades 152 and 154 separate and an arc 208 forms between contacts 153 and 155, current flows through said arc from contact 153 to contact 155. The transverse magnetic field, with lines of force from leg 183*a* to leg 182*a*, acting on such arc with current flow as described, will therefore "blow" the arc forward toward arc plates 134. This "blowing" action effectively increases the arc length and resistance and therefore arc voltage, consequently limiting the current as well as extinguishing the arc. The magnetic field also aids the rate of dielectric strength recovery of the gap across contacts 153 and 155 following are extinction and the subsequent continued rise of the impressed voltage across the gap after current transfer. It should also be noted that by increasing arc voltage the transverse magnetic field has the effect of increasing the power factor of the circuit by inserting resistance into the essentially inductive short circuit thereby reducing the lag of current behind voltage. The power factor is increased almost to unity.

Blades 152 and 154 are elongated and pivotally mounted at respective points 151 and 170, which provides leverage effect to increase speed and resistance at the contact ends thereof when actuated by magnetic core 156. Thus, when core 156 is energized to raise armature pin 161 a given distance within a given time, the contact ends of blades 152 and 154 and respective contacts 153 and 155, will move apart a greater distance within a shorter time than the corresponding displacement and rate of speed of armature pin 161.

The contact blades 152 and 154, and contacts 153 and 155, are shaped and dimensioned to provide structures of relatively low mass and minimum inertia to respond quickly and open rapidly when the electromagnet is energized.

The contact blades 152 and 154 are constructed, dimensioned and mounted with respect to the actuating electromagnet (magnetic core 156, armature 158) to provide a gap on the order of one-quarter inch within one sixteenth cycle of current flow or about 0.001 seconds (within one millisecond).

The electromagnetic means (magnetic core 156, armature 158, pin 161, and connecting links), the field magnet structure 181, blades 152 and 154, and the particular way in which they are positioned and associated as described, serve to open the current limiting contacts 153 and 155 in about 0.0002 seconds (0.2 of a millisecond) from initiation of a fault current in the circuit above the threshold selected for operation of the current limiting section, or within one-eightieth cycle of current flow.

Under conditions of high available short circuit currents, the limiter contacts 153 and 155 are open in as little a time as 0.2 milliseconds (one-eightieth of a cycle) from current initiation. As the contacts open an arc is formed between them. The arc between the limiting contacts is ordinarily extinguished within one millisecond by the structure and mechanism of this invention. It should be borne in mind that the mechanism described responds with the square of the magnitude of fault current so the larger the fault current, the faster the current limiting response. This accelerating responsiveness includes not only the speed of contact separation, but the effective responsiveness of the transverse magnetic field generated by field magnet structure 181 on the arc formed between contacts 153 and 155 which raises the arc voltage almost instantaneously to equal the voltage of the source by the means described (essentially by lengthening the arc through faster and greater contact separation plus bowing forwardly, plus cooling, all of which increase resistance of the arc and arc voltage). When the arc voltage equals the supply voltage, current can no longer continue to rise and is forced to transfer completely into the current limiting resistor 192 where its energy is dissipated.

The main breaker contacts 53 and 70 open within 0.004 seconds of fault current initiation, or within $\frac{1}{4}$ cycle of current flow at 60 cycles per second by which time the fault current has been fully shunted into current limiting resistor 192 and its energy dissipated. The main contacts 53 and 70 being opened, current has ceased to flow in the protected circuit in less than $\frac{1}{4}$ cycle or less than 4 milliseconds after appearance of the fault current above the threshold selected for the limiting section of the circuit breaker to become operable.

The effective current limiting responsiveness of the following combination, (1) speed of contact separation plus (2) increasing arc voltage to equal source voltage, occurs within about a millisecond or less by means of the invention described herein. This is important because symmetrical short circuit currents have their maximum growth rate during the first millisecond immediately following current zero. The current limiting means in accordance with this invention intercepts the short circuit current before it achieves a significant growth following current zero and shunts it into limiting resistance 192 having a positive temperature coeffecient of resistance.

The mechanism as described can be mounted in compact cases to fit in standard panelboards. The compactness may be measured in terms of the ratio of short circuit amperes of interrupting rating to circuit breaker volume. The table below provides a reasonable illustration of the volumetric efficiency of short circuit interruption of the subject breaker. The volume of five representative circuit breakers is given in the second column and the interrupting rating shown in column 3. The first circuit breaker in the following table is the subject matter of this application.

rent by generating high arc voltage have accordingly been bulky. They have had to include a large volume chamber in which to dissipate the shock waves and pressure gradients created by this means of current limiting. The invention herein combines arc voltage increase with other current limiting means, so the degrees of shock waves and pressure gradients are substantially less than in those devices which rely on the arc voltage means alone. Furthermore, plates 134 are particularly shaped, dimensioned and mounted as described above with respect to the arc, its path of movement, plus the direction of shock waves and air pressure gradients created, to intercept and effectively dissipate such forces without requiring a relatively large volume chamber.

The arc extinguishing material which coats the magnetic core structure 181 and lines the inside of the rectangular tube formed thereby and the inner sides of the conductor turns 188*d* and 199*a* to a large extent determines the rate of dielectric strength recovery across the contacts during and immediately following arc extinction. The dielectric strength recovery is essential to the current limiting process and is further aided by the magnetic field. The arc extinguishing material is selected in accordance with the disclosure of the above mentioned copending application, Ser. No. 364,596.

The resistor 192 should have a positively transformable resistance, capable of changing from an extremely low value to a much higher value after the arc across the contacts 153 and 155 is extinguished and the total current is forced to flow through the resistor and bypass the contacts. The transformation of the resistance increases the circuit power factor, aids interruption, and limits the "through" $i^2t$ (product of the square of the current and the time) factor of the short circuit.

Various modifications may be made in the structure shown and described without departing from the spirit of the invention and scope of the attached claims.

I claim:

1. A current limiting resistor shunted by a pair of engaged contacts in a circuit breaker adapted to be separated in response to a fault current for directing said fault current through said resistor to a low resistance

| | (1) Breaker Ampere Rating* | (2) Breaker Volume Cubic Inches (Typical Brkr.) | (3) Maximum Interrupting Rating, 480V, 30,K-Amps rms | (4) Volumetric Efficiency $KVA/in.^3$ |
|---|---|---|---|---|
| Instant Inven. | 100 | 138 | 100-200** | 347-694 |
| Representative Circuit Breakers for comparison | 100 | 85 | 25 | 142 |
| | 225 | 131 | 35 | 128 |
| | 400 | 273 | 35 | 61.5 |
| | 1000 | 569 | 35 | 29.5 |
| | 2500 | 1994 | 85 | 20 |

*This is the steady state current rating, all breakers listed are molded case circuit breakers.
**The 100 KA rating is an established but not a maximum figure.

An additional feature of this invention which aids in fitting a mechanism of high interrupting capacity within a circuit breaker of minimum volume, are plates 134 positioned forward of limiting contacts 153, 155 and blades 152, 154. One of the current limiting features of this invention is the rapid increase of arc voltage to equal source voltage. However, when high arc energy is applied to the air slab in the arc chamber, the air temperature rises very rapidly which creates shock waves and large pressure gradients which must be dissipated. The devices which have attempted to limit curconductor with said fault current having sufficient magnitude to rupture a direct connection between said resistor and said conductor, the improvement comprising;

a wire of a material having a positive temperature coefficient of resistance to create a relatively high value of volume resistivity in response to the passage of said fault current through said wire, and blowout preventive terminal end means having a volume resistivity intermediate the volume resistivity of said wire and the volume resistivity of said low resistance conductor interconnecting said wire to said low resistance conductor through a path avoiding undue conduction constriction of said fault current.

2. A current limiting resistor as set forth in claim 1, wherein said blowout preventive terminal end means comprises integrally formed aperture means to receive a screw fastener to connect said resistor to said conductor, said resistor including a cylindrical cross-section for the major length thereof and flattened opposite end portions formed into an arcuate shape to substantially encircle respectively said aperture means.

3. A current limiting resistor as set forth in claim 1, wherein said conductor is formed of copper, said wire is formed of iron and said blowout preventive terminal means includes stainless steel for electrical connection to said wire and a copper cladding for electrical connection to said conductor.

4. A circuit breaker comprising:

a current limiting resistor, a pair of contacts in shunt with said resistor and separable in response to a high fault current for thereafter passing a said current through said resistor, said resistor formed by a length of metal having a positive temperature coefficient of resistance, said length of metal including a plurality of continuously joined sinuous segments in parallel spaced apart relationship, the distance which said segments are spaced apart being such to permit the magnetic field of one of said segments resulting from current flow therein to interact with the resulting magnetic field of an adjacent segment to substantially reduce inductance of a circuit in which said resistor is connected for preventing the maintenance of an arc potential across the separated contacts.

5. A circuit breaker as set forth in claim 4, wherein said sinuous segments are arranged to carry current in a direction opposite to that of a next adjacent segment for a substantial portion of the length of each of such segments and said circuit breaker includes a recess of limited space in which said segments are located, and a heat transmitting ceramic material potting said segments in said recess.

6. A circuit breaker as set forth in claim 4, wherein said plurality of continuously joined sinuous segments include a first plurality of relatively short segments having aligned longitudinal axes interconnected by transverse portions and a second plurality of relatively long segments having aligned longitudinal axes extending transversely to the longitudinal axes of said short segments with an end segment of said resistor extending past said transverse portions and carrying current in a direction opposite the current in said transverse portions.

7. A circuit breaker as set forth in claim 4, wherein said resistor is a wire of substantially pure iron.

8. A circuit breaker as set forth in claim 4, in which said resistor is a strip of substantially pure iron of small cross-section relative to its length, said cross-section being of angular configuration and having at least one flat side for a substantial portion of the length of said resistor.

9. A circuit breaker as set forth in claim 8 wherein said angular configuration of said cross-section is a square.

10. A current limiting resistor as set forth in claim 1, wherein said resistor is operable in a circuit having available fault current up to 100,000 amperes root mean square symmetrical.

* * * * *

UNITED STATES PATENT AND TRADEMARK OFFICE
CERTIFICATE OF CORRECTION

PATENT NO. : 4,178,618
DATED : December 11, 1979
INVENTOR(S) : Joseph M. Khalid

It is certified that error appears in the above-identified patent and that said Letters Patent are hereby corrected as shown below:

Col. 6, line 54, change "136h" to read --186h--.

Col. 8, line 12, delete "tionshp" and insert --tionship--.

Col. 11, line 18, delete "(Figs. 1 and 2)" and insert --(Figs. 1 and 24)--.

Col. 14, line 14, delete "are" and insert --arc--.

Col. 15, chart change "

| | | | | |
|---|---|---|---|---|
| | 100 | 138 | 100-200** | 347-694 " |
| Instant Inven. | | | | |

to read --

| | | | | |
|---|---|---|---|---|
| Instant Inven. | 100 | 138 | 100-200** | 347-694 |

Signed and Sealed this

*Thirtieth* Day of *September 1980*

[SEAL]

*Attest:*

SIDNEY A. DIAMOND

*Attesting Officer* *Commissioner of Patents and Trademarks*